United States Patent
Hertz et al.

(10) Patent No.: US 7,268,451 B2
(45) Date of Patent: Sep. 11, 2007

(54) MOTOR RESOLVER ASSEMBLY AND METHOD OF MEASURING SPEED AND POSITION OF A MOTOR ROTOR

(75) Inventors: Erik M. Hertz, Ellicott City, MD (US); Christopher J. Bowes, Indianapolis, IN (US); Alan G. Holmes, Clarkston, MI (US); James A. Raszkowski, Indianapolis, IN (US)

(73) Assignees: General Motors Corporation, Detroit, MI (US); DaimlerChrysler AG, Stuttgart (DE); DaimlerChrysler Corporation, Auburn Hills, MI (US)

( * ) Notice: Subject to any disclaimer, the term of this patent is extended or adjusted under 35 U.S.C. 154(b) by 290 days.

(21) Appl. No.: 11/060,226

(22) Filed: Feb. 17, 2005

(65) Prior Publication Data

US 2005/0206253 A1    Sep. 22, 2005

Related U.S. Application Data

(60) Provisional application No. 60/555,141, filed on Mar. 22, 2004.

(51) Int. Cl.
*B60K 1/00* (2006.01)
*H02K 11/00* (2006.01)

(52) U.S. Cl. ................ 310/68 B; 180/65.2; 290/40 C; 384/448; 310/112

(58) Field of Classification Search ............. 310/68 B, 310/112; 324/207.25, 160, 163, 166, 173, 324/174; 384/448; 290/40 C
See application file for complete search history.

(56) References Cited

U.S. PATENT DOCUMENTS

| | | | |
|---|---|---|---|
| 6,252,159 B1 * | 6/2001 | Anagnos | 174/377 |
| 6,373,155 B1 * | 4/2002 | Shimizu et al. | 310/68 B |
| 6,474,428 B1 * | 11/2002 | Fujikawa et al. | 180/65.2 |
| 6,492,742 B1 * | 12/2002 | Fujikawa et al. | 290/40 C |
| 6,508,348 B2 * | 1/2003 | Sugano | 192/110 B |
| 6,628,021 B2 | 9/2003 | Shinohara et al. | 310/68 |
| 6,666,289 B2 * | 12/2003 | Shimizu | 180/65.2 |
| 6,679,796 B2 * | 1/2004 | Sugano | 474/28 |
| 6,952,152 B2 * | 10/2005 | Miya et al. | 336/115 |
| 7,002,267 B2 * | 2/2006 | Raszkowski et al. | 310/54 |
| 2001/0013731 A1 * | 8/2001 | Shinohara et al. | 310/85 |
| 2004/0150395 A1 * | 8/2004 | Miya et al. | 324/207.25 |

(Continued)

FOREIGN PATENT DOCUMENTS

JP    09065617    * 3/1997

(Continued)

OTHER PUBLICATIONS

Machine translation of 2001-078393, "rotary machine with resolver", Mar. 2001.*

(Continued)

*Primary Examiner*—Karl Tamai

(57) ABSTRACT

A motor resolver assembly includes a resolver stator and a resolver rotor positioned radially inward of and rotatable with respect to the resolver stator. First and second relatively rotatable shield components generally surround the resolver stator and rotor to shield them from electromagnetic energy from a radially outward motor rotor and motor stator. A method of measuring speed and position of the motor rotor relative to the motor stator is also employed.

15 Claims, 3 Drawing Sheets

U.S. PATENT DOCUMENTS

| | | | |
|---|---|---|---|
| 2005/0205335 A1* | 9/2005 | Reed et al. | 180/292 |
| 2005/0206134 A1* | 9/2005 | Raszkowski et al. | 280/728.2 |
| 2005/0206248 A1* | 9/2005 | Raszkowski et al. | 310/54 |
| 2005/0206253 A1* | 9/2005 | Hertz et al. | 310/68 B |
| 2005/0206349 A1* | 9/2005 | Raszkowski et al. | 322/15 |
| 2005/0209038 A1* | 9/2005 | Kempf et al. | 475/159 |
| 2005/0209040 A1* | 9/2005 | Foster et al. | 475/159 |
| 2006/0226719 A1* | 10/2006 | Nakanishi et al. | 310/68 B |

FOREIGN PATENT DOCUMENTS

JP       2001-078393       *   3/2001

OTHER PUBLICATIONS

Machine tranlation of 09065617, "motor with resolver", Mar. 1997.*

* cited by examiner

US 7,268,451 B2

MOTOR RESOLVER ASSEMBLY AND METHOD OF MEASURING SPEED AND POSITION OF A MOTOR ROTOR

CROSS REFERENCE TO RELATED APPLICATIONS

This application claims the benefit of U.S. Provisional Application 60/555,141, filed Mar. 22, 2004, which is hereby incorporated by reference in its entirety.

TECHNICAL FIELD

The invention relates to a motor resolver for measuring speed and position of a motor rotor.

BACKGROUND OF THE INVENTION

Electric motors such as those employed in hybrid vehicles with electromechanical transmissions utilize controllers that rely on accurate and reliable measurement of rotor speed and position for smooth torque application between the motors, an input shaft from an engine and an output member. Multiple speed sensors measuring rotation of target wheels may be employed, but these components require accurate positioning of the speed sensors relative to one another (e.g., exactly 90 degrees apart from one another) which necessitates tight machining tolerances of the transmission case housing the sensors and requires extra space for target wheels. External speed sensors (i.e., external to the motor) increase overall transmission length and also require targets that add inertia.

SUMMARY OF THE INVENTION

An efficiently packaged motor resolver assembly is provided with unique shielding components that ensure the accuracy and reliability of rotor speed and position signals obtained by the resolver assembly. Accordingly, a motor resolver assembly for an electric motor having a stator and a rotor includes a resolver stator and a resolver rotor positioned radially inward of the resolver stator. The resolver rotor is rotatable with respect to the resolver stator. The motor resolver assembly includes first and second shield components that generally surround the resolver stator and rotor. The first shield component is rotatable with the resolver rotor and with respect to the second shield component. The first and second shield components thereby protect the resolver stator and rotor from external electromagnetic interference, such as that emanating from the motor stator and rotor.

Preferably, the motor stator and rotor are positioned radially outward of the resolver stator and rotor and the shield components are positioned radially between the electric motor and the resolver motor and stator. The motor rotor and the resolver rotor may be supported on a rotor hub so that both rotate with the rotor hub. Preferably, the first resolver shield, which may be referred to as a rotor shield, is interference fit between the rotor hub and the resolver rotor. Also preferably, the motor stator is supported by a motor housing and the second shield component (which may be referred to as a stator shield) is supported by the same motor housing. The resolver stator may be interference fit with the stator shield.

The rotor shield and the stator shield must be relatively rotatable with respect to one another. This is achieved by configuring the rotor shield with a first radial portion and a first axial portion extending therefrom toward the stator shield. The stator shield, likewise is configured with a second radial portion and a second axial portion extending therefrom toward the rotor shield. The first and second axial portions are radially displaced from one another to form an annular opening therebetween which permits relative rotation of the rotor shield and stator shield. Preferably, the first and second axial portions overlap to make it difficult for external electromagnetic interference to pass between the axial portions. The rotor shield and the stator shield are preferably formed from copper-plated steel and are grounded so that electromagnetic energy is conducted away by them to a common ground with the electric motor.

The invention also provides a method of measuring speed and position of a motor rotor relative to a motor stator. The method includes positioning a motor resolver radially inward of the motor rotor and the motor stator. The motor resolver has a resolver stator and a resolver rotor. The method further includes generally surrounding the motor resolver with first and second shield components (i.e., the rotor shield and the stator shield) to block electromagnetic interference from the motor rotor and the motor stator from affecting the motor resolver. The relative speed and position of the resolver rotor and the resolver stator are then determined. Preferably, the method includes supporting the motor rotor on a rotor hub and supporting the resolver rotor on the same rotor hub as well as fitting the rotor shield between the rotor hub and the resolver rotor. Also preferably, the method includes supporting the motor stator on the motor housing and supporting the second shield component on the same motor housing as well as fitting the resolver stator on the second shield component. Thus, the position of the resolver rotor is indicative of the position of the motor rotor as they are both supported by the same component (the rotor hub). The position of the resolver stator and the motor stator are also related as they are supported on the same motor housing.

The above features and advantages and other features and advantages of the present invention are readily apparent from the following detailed description of the best mode for carrying out the invention when taken in connection with the accompanying drawings.

DESCRIPTION OF THE PREFERRED EMBODIMENT

Figure 1:
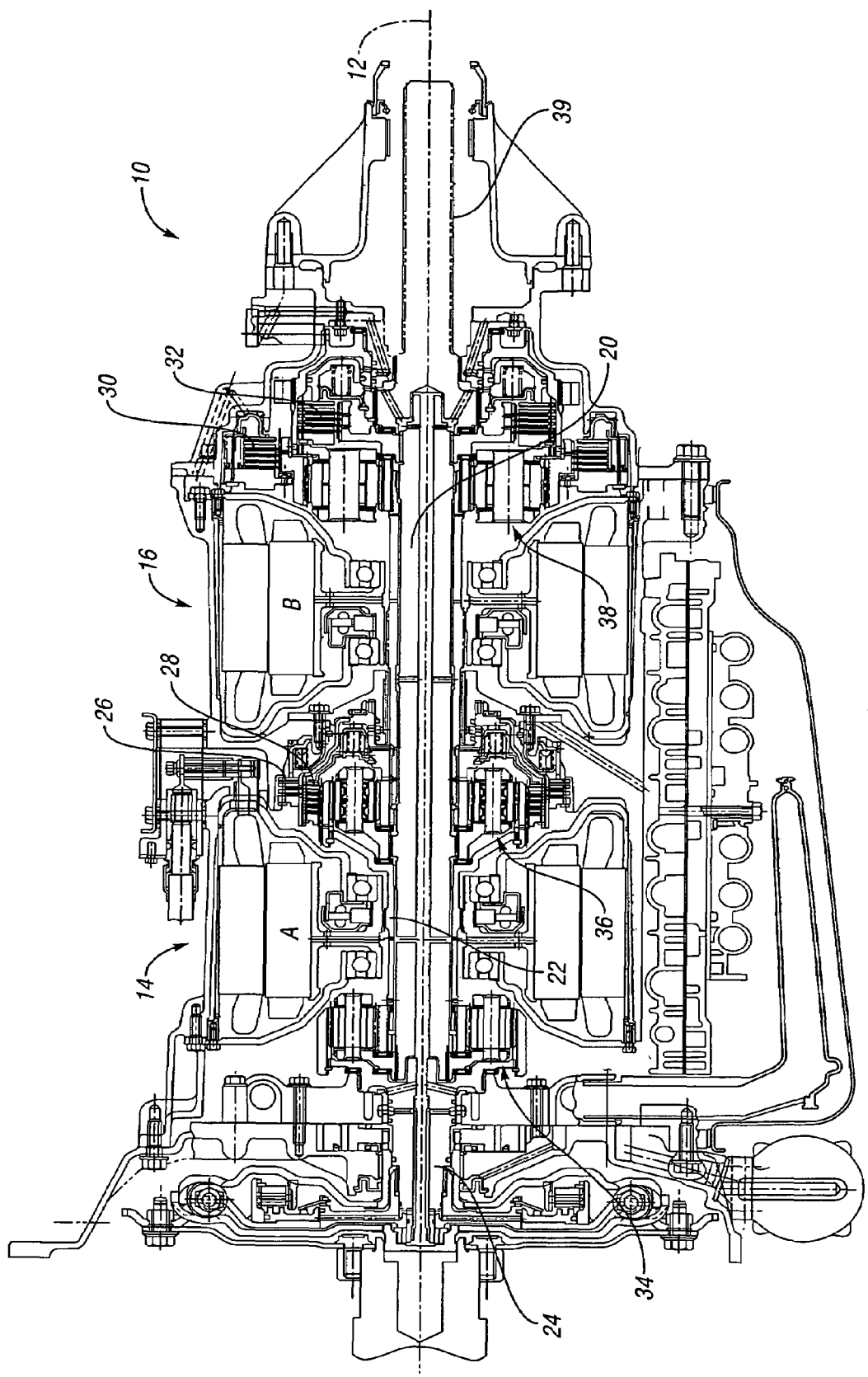
FIG. 1 is a schematic cross-sectional illustration of a hybrid electromechanical transmission having electric motor/generators.

Referring to the drawings, wherein like reference numbers refer to like components, FIG. 1 shows a hybrid electromechanical transmission 10 with a center axis 12. First and second electric motor/generator modules 14, 16, labeled A and B respectively in FIG. 1, are disposed about the center axis 12 within the transmission 10. Each of the motor/generator modules includes a rotor, a rotor hub supporting the rotor, a stator, and a motor housing supporting the stator, as shown and described with respect to FIG. 2, below. A main shaft 20 is longitudinally disposed, rotatable about the center axis 12. A plurality of inner shafts, such as inner shaft 22, are concentrically disposed about the main shaft 20, and are likewise rotatable about the center axis. An input shaft 24 is disposed forward of the main shaft 20 and is operable for transferring power from an engine (not shown) to the transmission 10. Engagement of one or more of a plurality of clutches included in the transmission 10 (first, second, third and fourth clutches, 26, 28, 30 and 32 respectively, being shown) interconnects one or more of first, second and third planetary gear sets 34, 36, and 38, respectively, to transfer power at varying ratios to an output member 39.

Figure 2:
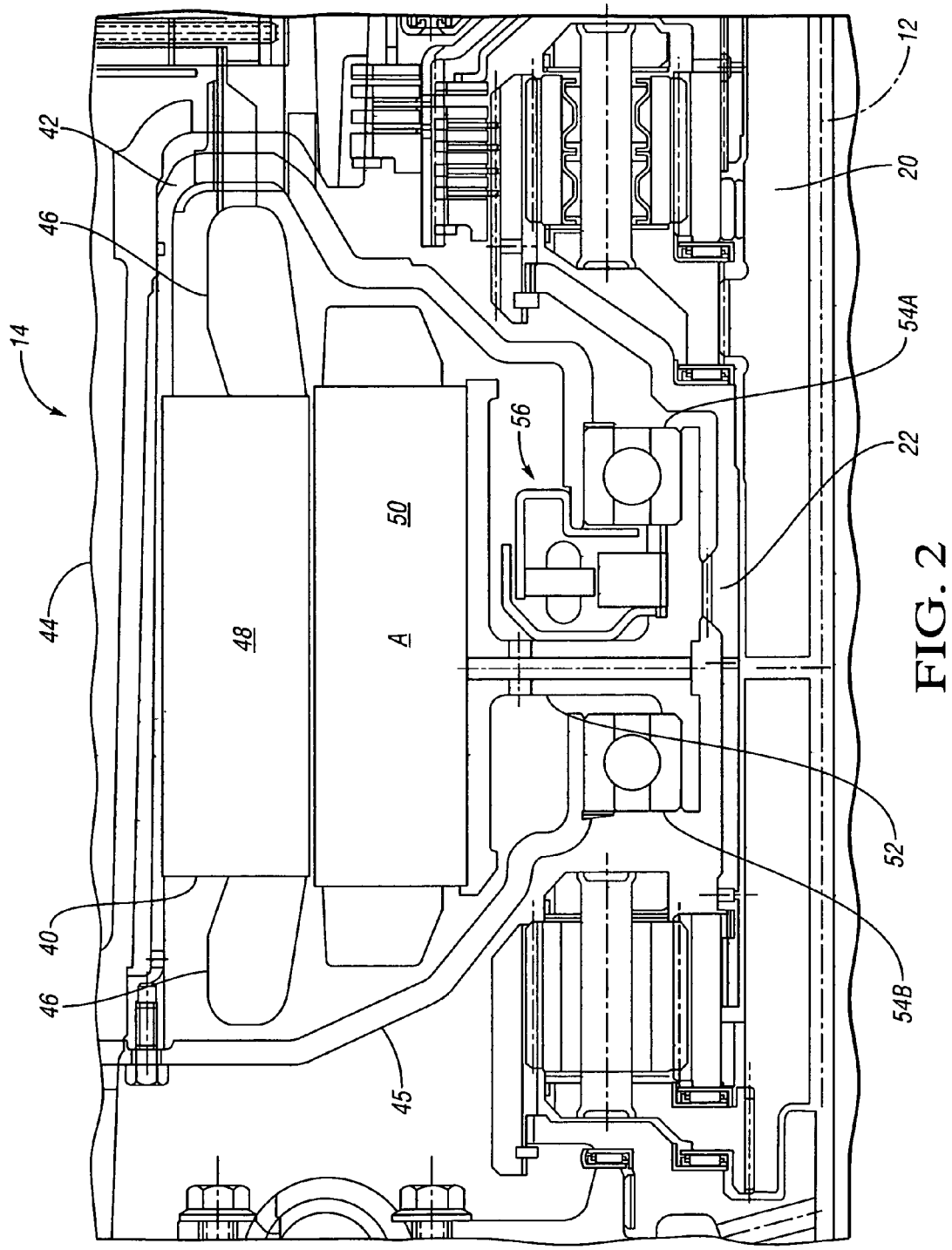
FIG. 2 is a schematic cross-sectional illustration in fragmentary view of one of the motor/generators of FIG. 1 with a motor resolver assembly installed radially inward thereof.

Referring to FIG. 2, the first motor/generator module 14 includes a motor stator 40 secured to a first portion of a motor housing 42 which is grounded to an outer transmission case 44. The motor stator 40 includes a stator core 48 with coiled electrical windings 46 extending therefrom. A motor rotor 50 is supported on a rotor hub 52 which is rotatable about the center axis 12. The motor rotor 50 is sized to fit within the stator 48 and rotates in response to selective charging of the windings 46, as is well understood by those skilled in the art. The motor rotor 50 and motor stator 40 together may be referred to as an electric motor 40, 50. Bearing 54A is positioned between the rotor hub 52 and the first portion of the motor housing 42 and bearing 54B is positioned between the rotor hub 52 and a second portion of the motor housing 45 that cooperates with the first portion 42 to enclose the motor rotor 50 and motor stator 40. Together, the motor rotor 50 and motor stator 40 are an electric motor 40, 50. A motor resolver assembly 56 (discussed in more detail with respect to FIG. 3) is positioned between the bearing 54A and the rotor hub 52. A like electric motor and motor resolver assembly is employed in the second motor/generator module 16 of FIG. 1.

Figure 3:
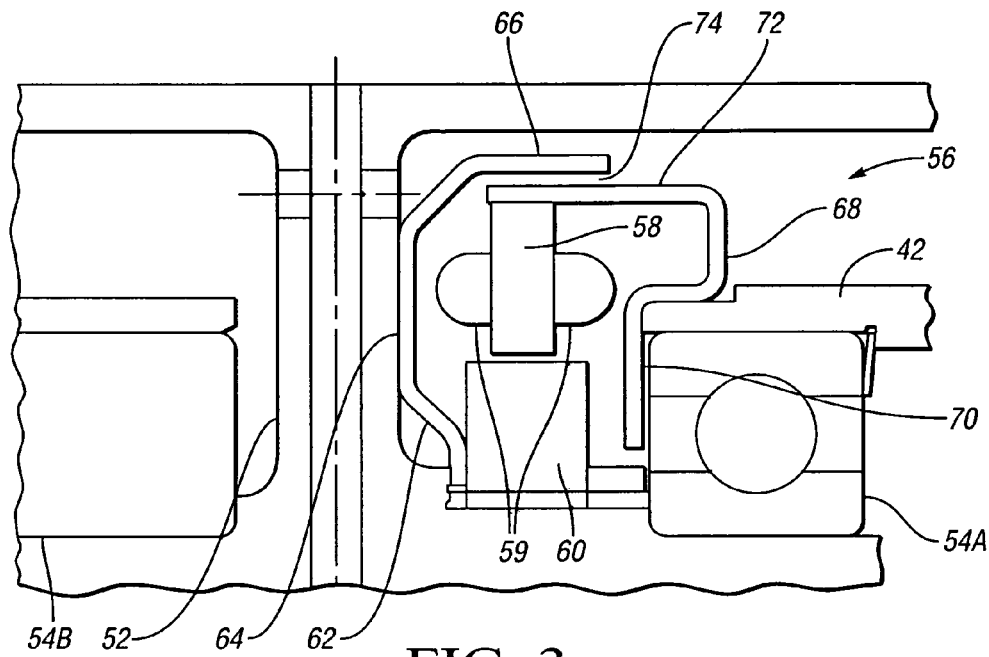
FIG. 3 is a schematic cross-sectional illustration in fragmentary view of the motor resolver assembly of FIG. 2.

Referring to FIG. 3, a motor resolver includes a resolver stator 58 and a resolver rotor 60. The resolver 58, 60 operates by sensing the relative motion of the lobed resolver rotor 60 turning inside the resolver stator 58 with a series of inductive coils 59. The stator coils 59 receive an excitation signal from a motor controller (not shown) and two pickup coils (not shown, but preferably located in a like radial position on the resolver stator 58 as the stator coils 59) return the signal to the controller with voltage levels dependent on the proximity and speed of the lobes of the rotor. Those skilled in the art will readily understand the design and function of the resolver rotor 60 and the resolver stator 58. The resolver rotor 60 is supported on the rotor hub 52. A first resolver shield component 62, which may be referred to herein as a rotor shield 62, is interference fit between the motor rotor 52 and the resolver rotor 60. The rotor shield 62 includes a generally radially extending portion 64 and a generally axial portion 66 which extends therefrom. A second resolver shield component 68, which may be referred to herein as a stator shield 68, includes a generally radial portion 70 and a generally axial portion 72 extending axially therefrom. Together, the motor resolver 58, 60 and the shield components 62, 68 may be referred to as a motor resolver assembly 56. The stator shield 68 is supported at least partially by the first portion of the motor housing 42. The resolver stator 58 is interference fit with the stator shield 68. The first axial portion 66 and the second axial portion 72 extend toward one another, overlap and are radially spaced to form an annular slot 74. The relative speed and position of the motor rotor 50 with respect to the motor stator 40 may be determined by measuring the relative position of the resolver rotor 60 with respect to the resolver stator 58 (because the resolver rotor 60 is mounted on and rotates with the rotor hub 52 and the resolver stator 58 is stationary and mounted on the first motor housing portion 42 which also supports the motor stator 40). Because the stator shield 68 and the rotor shield 64 surround the motor resolver 58, 60, the overlapping nature of the rotor shield 62 and the stator shield 68 prevents motor 40, 50 magnetic fields from creating speed signal interference. The motor 48, 50 whose speed the resolver assembly 56 monitors emits strong electromagnetic interference (EMI) or electromagnetic noise due to its rotating fields and the high-frequency switching done by the motor controller. Preferably, electromagnetic energy from the motor rotor 50 and the motor stator 40 is grounded by the shield components 62, 68. The shield components 62, 68 are preferably formed from copper plated steel stampings and form a labyrinth, overlapping one another to isolate the motor resolver 58, 60 from magnetic fields. Electromagnetic energy from the motor rotor 50 and motor stator 40 is conducted away by the shield components 62, 68 and directed to ground. The rotor hub 52, the first portion of the motor housing 42 and the bearing 54A act as a continuation of the shield components to further intercept and ground the electromagnetic energy. Similar shields (not shown), are used in a motor resolver assembly employed with the second motor/generator 16.

Figure 4:
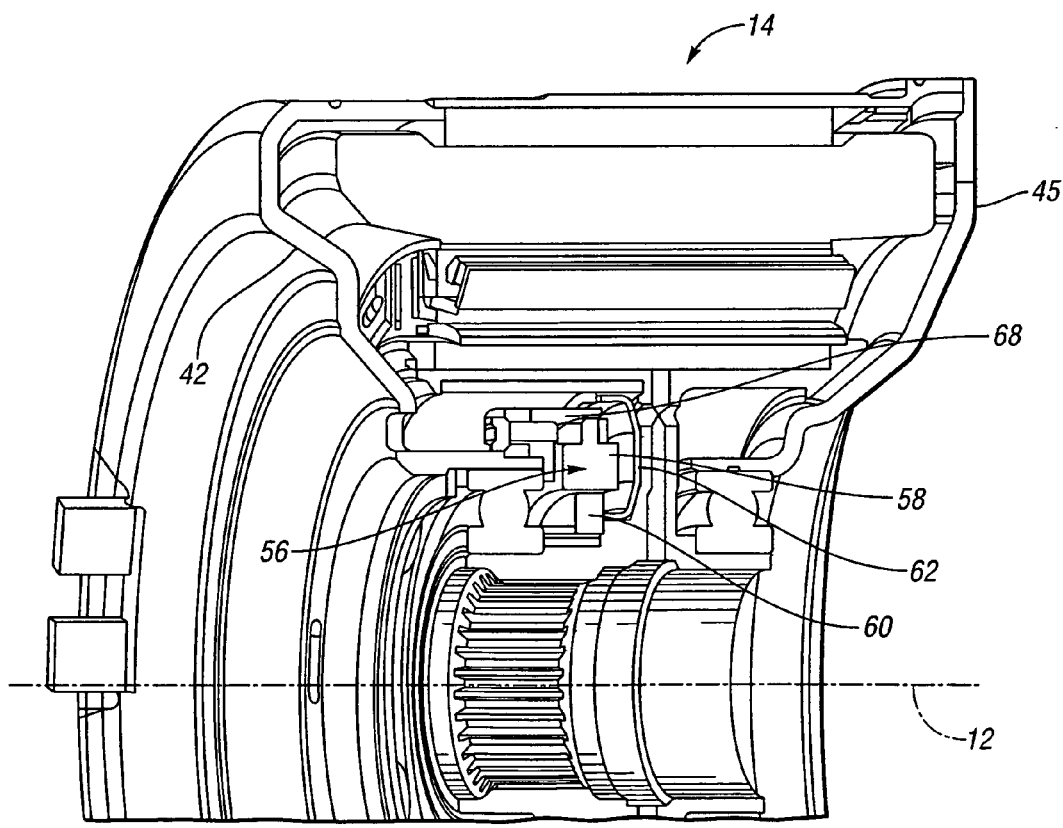
FIG. 4 is a schematic perspective illustration in fragmentary cross-sectional view of the motor/generator and motor resolver assembly of FIGS. 2 and 3.

Referring to FIG. 4, another view of the first and second shield components 62, 68 illustrates the surrounding and overlapping nature of the shield components 62, 68 with respect to the resolver stator 58 and the resolver rotor 60.

Accordingly, referring to the structure of FIGS. 1-4, a method of measuring speed and position of a motor rotor 50 includes positioning a motor resolver 58, 60 radially inward of the motor rotor 50 and a motor stator 48. Next, the method includes generally surrounding the motor resolver 58, 60 with first and second shield components 62, 68 to block electromagnetic interference from the motor rotor 50 and motor stator 48. The motor resolver assembly 56 includes the resolver stator 58, the resolver rotor 60 and the first and second shield components 62, 68. One of the first and second shield components 62, 68 is rotatable relative to the other (the rotor shield 62 is rotatable with respect to the stator shield 68), and the method further includes measuring the relative speed and position of the resolver rotor 60 and the resolver stator 58.

Preferably, the method also includes supporting the motor rotor 50 on a rotor hub 52 and supporting the resolver rotor 60 on the same rotor hub 52; thus, the resolver rotor 60 rotates at the same speed as the motor rotor 50 and may be used as an indication of the speed and position of the motor rotor 50. The method also includes fitting the first shield component (the rotor shield 62) between the rotor hub 52 and the resolver rotor 60.

The method may further include supporting the motor stator 40 on a motor housing 42 and supporting the second shield component (the stator shield 68) on the same component, the motor housing 42. The resolver stator 58 is fit on the stator shield 68. Thus, the relative position of the resolver stator 58 and resolver rotor 60 are indicative of the relative position of the motor stator 40 and the motor rotor 50, as the rotors 50, 60 rotate with the same rotor hub 52 and the stators 40, 58 are fit to the same stationary component, the motor housing 42.

While the best mode for carrying out the invention has been described in detail, those familiar with the art to which this invention relates will recognize various alternative designs and embodiments for practicing the invention within the scope of the appended claims.

The invention claimed is:

1. A motor resolver assembly for an electric motor having a stator and a rotor, the resolver assembly comprising:
   a resolver stator;
   a resolver rotor positioned radially inward of and rotatable with respect to said resolver stator;
   first and second shield components generally surrounding said resolver stator and said resolver rotor; said first shield component being rotatable with said resolver rotor and with respect to said second shield component;
   wherein said first and second shield components thereby protect said resolver stator and resolver rotor from external electromagnetic interference; and wherein the first and second shield components are positioned radially between the electric motor and said resolver rotor and resolver stator.

2. The motor resolver assembly of claim 1, wherein the stator and rotor of the electric motor are positioned radially outward of said resolver stator, said resolver rotor and said first and second shield components; said first and second shield components thereby protecting said resolver stator and resolver rotor from external electromagnetic interference of the electric motor.

3. The motor resolver assembly of claim 1, wherein the motor rotor is support an a rotor hub; wherein said resolver rotor rotates with the rotor hub; and wherein said first resolver shield is interference fit between the rotor hub and said resolver rotor.

4. The motor resolver assembly of claim 1, wherein the motor stator is supported by a motor housing; and wherein the second shield component is supported by the motor housing.

5. The motor resolver assembly of claim 4, wherein said resolver stator is interference fit with said second shield component.

6. The motor resolver assembly of claim 1, wherein said first shield component has a first axial portion extending toward said second shield component; wherein said second shield component has a second axial portion extending toward said first shield component; wherein said component first and second axial portions are radially displaced from one another to from an annular opening therebetween to permit relative rotation of said first and second shield component.

7. The motor resolver assembly of claim 6, wherein said first and second axial portions at least partially overlap.

8. The motor resolver assembly of claim 1, wherein said first and said second shield components are copper-plated steel.

9. The motor resolver assembly of claim 1, wherein said first and said second shield components are grounded such that electromagnetic energy is conducted away by said first and second shield components.

10. A hybrid electromechanical transmission comprising:
    an electric motor having a motor stator and a motor rotor;
    a motor resolver having a resolver stator and a resolver rotor;
    first and second shield components positioned radially between said electric motor and said motor resolver and generally surrounding said motor resolver, said first shield component having a first radial portion and a first axial portion extending therefrom, said second shield component having a second radial portion and a second axial portion extending therefrom, said first axial portion extending toward said second radial portion, said second axial portion extending toward said first radial portion, and said first and second axial portions being radially displaced from one another and at least partially axially overlapping, thereby permitting relative rotation of said first and second shield components while protecting said resolver rotor and said resolver stator from electromagnetic interference from said motor rotor and said motor stator.

11. The hybrid electromechanical transmission of claim 10, further comprising:
    a rotor hub supporting said motor rotor;
    a motor housing enclosing said motor stator and motor rotor and supporting said motor stator;
    wherein said resolver rotor is supported by said rotor hub and rotates therewith;
    wherein said first shield component is interference fit with said rotor hub;
    wherein said resolver stator is supported at least partially by said motor housing; and
    wherein said resolver stator is interference fit with said second shield component.

12. A method of measuring speed and position of a motor rotor relative to a motor stator, the method comprising:
    positioning a motor resolver radially inward of the motor rotor and the motor stator; wherein the motor resolver has a resolver stator and a resolver rotor;
    generally surrounding the motor resolver with first and second shield components to block electromagnetic interference from the motor rotor and motor stator, wherein one of said shield components is rotatable relative to the other of said shield components; and
    determining the relative speed and position of the resolver rotor and the resolver stator based upon signals from the resolver stator.

13. The method of claim 12, further comprising:
    supporting the motor rotor on a rotor hub;
    supporting the resolver rotor on the rotor hub; and
    fitting the first shield component between the rotor hub and the resolver rotor.

14. The method of claim 13, further comprising:
    supporting the motor stator on a motor housing;
    supporting the second shield component on the motor housing; and
    fitting the resolver stator on the second shield component.

15. The method of claim 14, further comprising:
    grounding the first and second shield components such that electromagnetic energy is conducted away by said first and second shield components.

* * * * *